3,214,262
PROCESS FOR PRODUCING DENSE IRON POWDERS FROM SPONGE IRON
Ludwig von Bogdandy, Essen-Frintrop, and Hans-Jürgen Eisfelder, Oberhausen, Rhineland, Germany, assignors to Firma Huttenwerk Oberhausen AG, Oberhausen, Rhineland, Germany, a corporation of Germany
No Drawing. Filed Nov. 19, 1962, Ser. No. 238,777
Claims priority, application Germany, Nov. 24, 1961, H 44,216
3 Claims. (Cl. 75—.5)

Our present invention relates to the production of dense iron powders, having minimum porosity, from sponge iron.

Heretofore iron powders have been produced from sponge iron by grinding, crushing or otherwise comminuting the sponge iron. Such powders are, however, not suitable for more recently developed techniques requiring iron powders. For example, in powder metallurgy wherein highly conductive welding electrodes and casings are to be formed by compaction of such powders, a substantially more dense iron powder is required. The dense powders are able to be compressed with greater facility and require only a minimum amount of binder. The powders resulting from the direct comminution of iron sponge are highly porous and of low specific gravity so as to be totally unsatisfactory for the purposes mentioned. One method previously proposed for producing iron powders having a high specific gravity, excellent compactability and minimum porosity, involves the comminution of the iron sponge to produce a light-weight porous powder which is subsequently heat-treated in muffle furnaces, heat-treatment cases and heated shells under a reducing atmosphere at temperatures of at least 1000° C. Upon cooling the resulting sintered mass is again comminuted whereupon the powder is annealed and further comminuted. The technical and economic disadvantages of this procedure will be readily apparent. Firstly, the high temperatures required for prolonged periods in this treatment often result in the thermal deformation of the shells, cases or muffles. Secondly, the powder often is sintered to these receptacles in the course of the heat-treatment as a consequence of the extremely large surface area of the iron powder and the prolonged high temperature. In an effort to obviate these disadvantages it has been suggested that a parting layer (e.g. a paper) be interposed between the powder and the receptacle to reduce adherence of the latter to the former. The paper layer was not found to be totally effective in this connection, however. Moreover, the thermal conductivity of the loosely piled powder is only a fraction of that of iron in a more compact state (e.g. of sponge iron). It is, therefore, necessary to deposit the powder in an extremely thin layer or to maintain it at the treating temperature for an extremely long period if all of the powder is to be treated to the desired degree.

It is an object of the present invention to provide an improved method of producing dense iron powder from iron sponge with great economy and substantially reduced processing time.

According to the present invention, iron powders of a pore-free character or with a substantially reduced number of pores are produced from sponge iron by heat-treating this sponge iron in the form of corherent agglomerates, pellets or briquettes in the presence of an atmosphere free from oxidizing agents (i.e. a so-called "neutral" or reducing atmosphere), the pieces of sponge iron thereafter being comminuted to the desired particle size. For the purposes of the present invention the term "briquettes" shall be employed hereinafter to describe the pieces and pellets of sponge iron whether they be agglomerates, rigidly coherent bodies, or compacted masses of sponge iron whose heat conduction substantially exceeds that of an equivalent quantity of loose powder and which as a substantially reduced exposed surface area.

A more particular feature of the invention resides in the treatment of these briquettes, which advantageously have a particle size between substantially 10 and 50 mm., at a temperature in the vicinity of 1000° C. and preferably somewhat above this temperature. The heat treatment can be carried out in conventional heat-treating furnaces such as lifting-beam or rotary-hearth furnaces and the like. The powder thus produced is, depending upon the treatment time and temperature, either totally or nearly free from pores and satisfactory for the production of compacted-powder objects such as high-conductivity welding electrodes. If it is desired to use the powder for sintered-metal technology and powder-metallurgy applications, the iron powder is annealed at a temperature somewhat above the recrystallization point and thereafter comminuted to a particle size less than 0.5 mm. The annealing temperature is, advantageously, on the order of 10 to 20° C. above the recrystallization point (i.e. between 600° and 900° C. depending upon the iron used). In any case, the process according to the invention results in a substantial reduction in the heating and cooling times when compared with earlier processes. The compact nature of the briquettes enables them to be heated substantially more quickly than comparable quantities of particles disposed in flat layers.

The sponge-iron briquettes may be produced with the aid of the method and apparatus disclosed in commonly assigned copending application Ser. No. 848,287, filed October 23, 1959, by Ludwig von Bogdandy, one of the present applicants, and now abandoned. In this copending application there is disclosed a method of producing sponge-iron pellets from iron-oxide ores wherein the iron oxide is pelletized by agglomerating the particles of the oxide in the presence of moisture and thereafter passed into a reducing furnace. The pellets are carried first into a preheating chamber wherein most of the moisture is driven off and the pellets are rendered coherent, and subsequently into a reducing chamber wherein a reducing gas consisting primarly of hydrogen and carbon monoxide is passed through the pellets. The latter are carried upon a moving continuous grate and then proceed into a cooling chamber wherein they give up at least some of their sensible heat which is employed to preheat the reducing gas. The resulting iron pellets are relatively porous and have the characteristics of sponge iron previously described. The pellets may then be treated in accordance with the process of the present invention for conversion into a relatively dense powder. The sponge iron may also be produced in accordance with the method disclosed in copending application Ser. No. 238,655, filed concurrently herewith by Ludwig von Bogdandy.

As an illustration of the reduction in treatment time for the sponge iron treated in accordance with the present invention with respect to earlier methods of treatment, it should be noted that experimental results indicate that with a heat-treating temperature of 1100° C., sufficient energy supply to maintain this temperature and a conductivity of 0.0028 cm.$^2$/sec. the following results are obtained:

When a loose layer of iron powder having a thickness of 50 mm. is heated from 20° to 1100° C., 83.8 minutes is required in comparison with an elapsed time of 7.5 minutes for an equivalent quantity of sponge-iron pellets having an approximate diameter of 30 mm. Similarly, the time required for cooling the powdered iron is 41.9 minutes as compared with 3.3 minutes for the pellets. Thus, the time required for heating the powder from 20° to 1100° C. and cooling it again to 65° C. is 125.7 minutes while the comparable elapsed time is 10.8 minutes for the pellets, a difference of 114.9 minutes or approximately two hours. It will be evident, therefore, that fusion of the pellets to the transport receptacle will be held to a minimum so that ceramic pallets can be employed (e.g. in a rotary hearth), in place of the muffles and cases previously required. The relatively short processing time permits the use of temperatures of up to 1400° C. without mechanical disadvantages.

*Example I*

Iron-oxide powder is pelletized and treated at a temperature between 600° and 1000° C. with gases rich in hydrogen to reduce the oxide to sponge iron as previously described. After cooling of the sponge iron, the resulting iron briquettes are heated to a temperature between 1000° and 1400° C. for a period between one-half and three hours under a blanket of a nonoxidizing protective gas, the period of ½ hour applying at the maximum temperature and the period of three hours at the minimum. This gas is, advantageously, free from oxygen and other oxidizing agents (e.g. carbon dioxide and water), and may contain some reducing gases such as hydrogen, carbon monoxide or methane. We prefer, however, to employ a gas consisting, in major part, of nitrogen as the protective atmosphere. Upon conclusion of this heat treatment the briquettes are comminuted into a powder having a particle size of about 1 mm., the powder being suitable for compaction in known manner into highly-conductive welding electrodes.

*Example II*

The powder resulting from Example I is annealed at a temperature between 600° and 900° C. under a blanket consisting primarily of hydrogen and, after cooling, is further comminuted to a particle size of about 0.5 mm. This powder is suitable for powder-metallurgy applications and the production of welding-electrode cores, casings and the like in the usual manner.

We claim:

1. A method of producing dense iron powder having limited porosity, comprising the successive steps of agglomerating an iron-oxide powder to produce coherent briquettes thereof having a diameter between substantially 10 and 50 mm.; heating said briquettes in a reducing atmosphere to convert said briquettes of iron-oxide into coherent bodies consisting substantially exclusively of sponge iron; cooling said bodies; thereafter heating said bodies in their coherent state to a temperature between substantially 1000° and 1400° C. in a nonoxidizing atmosphere for a period between substantially one-half and three hours; and thereafter comminuting said bodies to produce a powder having a particle size less than approximately 1 mm.

2. A method of producing dense iron powder having limited porosity, comprising the successive steps of agglomerating an iron-oxide powder to produce coherent briquettes thereof having a diameter between substantially 10 and 50 mm.; heating said briquettes in a reducing atmosphere to a temperature between substantially 600° and 1000° C. to convert said briquettes of iron-oxide into coherent bodies consisting substantially exclusively of sponge iron; cooling said bodies; thereafter heating said bodies in their coherent state at a temperature between substantially 1000° and 1400° C. in a nonoxidizing atmosphere for a period between substantially one-half and three hours; and thereafter comminuting said bodies to produce a powder having a particle size less than approximately 1 mm.

3. A method of producing dense iron powder having limited porosity, comprising the successive steps of agglomerating an iron-oxide powder to produce coherent briquettes thereof having a diameter between substantially 10 and 50 mm.; heating said briquettes in a reducing atmosphere to convert said briquettes of iron-oxide into coherent bodies consisting substantially exclusively of sponge iron; cooling said bodies; thereafter heating said bodies in their coherent state to a temperature between substantially 1000° and 1400° C. in a nonoxidizing atmosphere for a period between substantially one-half and three hours; thereafter comminuting said bodies to produce a powder having a particle size less than approximately 1 mm.; annealing said powder at a temperature slightly above the recrystallization temperature of the iron and between 400° and 900° C. under a reducing atmosphere; and comminuting the powder so annealed to a particle size of approximately 0.5 mm.

References Cited by the Examiner

UNITED STATES PATENTS

| | | | |
|---|---|---|---|
| 1,878,589 | 9/32 | Marris et al. | 148—105 |
| 2,097,502 | 11/37 | Southgate | 29—192 |
| 2,306,665 | 12/42 | Schwarzkopf | 75—.5 |
| 2,668,105 | 2/54 | De Jahn | 75—.5 |
| 2,759,808 | 8/56 | Kuzmick et al. | 75—.5 |
| 2,811,433 | 10/57 | Whitehouse et al. | 75—.5 |
| 2,853,767 | 9/58 | Burkhammer | 75—.5 |
| 2,857,270 | 10/58 | Brundin | 75—.5 |
| 2,860,044 | 11/58 | Brundin | 75—.5 |
| 3,067,032 | 12/62 | Reed et al. | 75—.5 |

FOREIGN PATENTS 781,232    8/57    Great Britain.

OTHER REFERENCES

Goetzel: Treatise on Powder Metallurgy, vol. 1, Interscience Publishers, New York (1949), pp. 673–676.

DAVID L. RECK, *Primary Examiner.*